Figure 1:
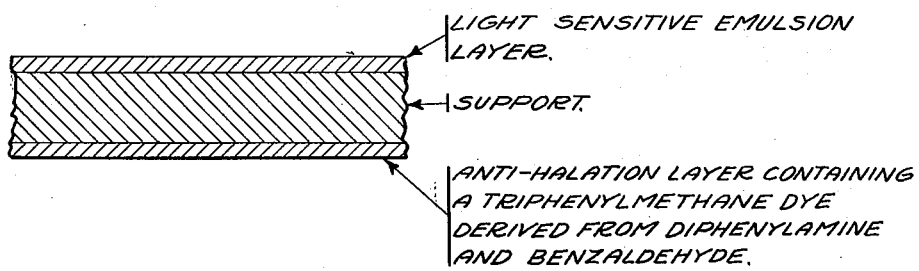

May 12, 1942. W. SCHNEIDER ET AL 2,282,890
ANTIHALO COATING FOR PHOTOGRAPHIC MATERIAL
Filed May 14, 1940

INVENTORS
WILHELM SCHNEIDER
RICHARD BRODERSEN
OSWALD MEISSNER
MAX COENEN
BY
THEIR ATTORNEYS

Patented May 12, 1942

2,282,890

UNITED STATES PATENT OFFICE 2,282,890

ANTIHALO COATING FOR PHOTOGRAPHIC MATERIAL

Wilhelm Schneider and Richard Brodersen, Dessau, and Oswald Meissner and Max Coenen, Uerdingen, Germany, assignors to General Aniline & Film Corporation, New York, N. Y., a corporation of Delaware Application May 14, 1940, Serial No. 335,142
In Germany March 28, 1939

4 Claims. (Cl. 95—8)

This invention relates to antihalo coatings for photographic material.

It is known to provide panchromatic photographic plates and films with green antihalo backings for anti-halation purposes. Malachite-green, tetramethyl-1.4-diaminotriphenylmethane and similar compounds, mostly in the form of their sulfo- or methane-sulfo acids, serve as green dyestuffs. The absorption maxima of all these dyestuffs lie not far from the interval of 610–640m$\mu$, which protects the sensitizing region of the usual panchromatic sensitizers against halation. For the purpose of normal black-and-white photography these dyestuffs are therefore absolutely sufficient.

In order to obtain in color photography absolutely correct color registration, it is sometimes necessary to use sensitizers, the sensitizing maxima of which lie beyond 650m$\mu$. For such purposes the dyestuffs mentioned above are useless.

It is therefore an object of this invention to produce dyestuffs for antihalo coatings.

Another object is the provision of triphenylmethane dyestuffs for antihalo coatings absorbing the light at least up to the wave length of 700m$\mu$.

A still further object is to provide such dyestuffs from antihalo coatings being derived from diphenylamine.

These and other objects will be seen from the detailed specification and examples following hereinafter.

Our invention is based on the observation that for the purposes of antihalo coatings green triphenylmethane dyestuffs may be advantageously employed which generally are obtained by condensing two mols diphenylamine and one mol benzaldehyde. The maxima of these dyestuffs lie according to substitution at 660–680m$\mu$. Contrary to a great deal of other green triphenylmethane dyestuffs they have the advantage to show a rather flat absorption curve towards the region of the long waves, which means, they are able to still protect a spectral region beyond 700m$\mu$.

All these dyestuffs are photographically free from harmful effects. They do not possess any properties harmful to sensitivity, gradation and sensitization and may be destroyed quickly and irreversibly in the photographic treating baths. Also the combination of both dyestuff-types, i. e. diphenylamine dyestuffs containing nitro groups, may be employed with great advantage. The preparation of the dyestuffs is done according to methods known in literature. They may be substituted at will, for instance by sulfo- and carboxyl groups.

Figure 2:
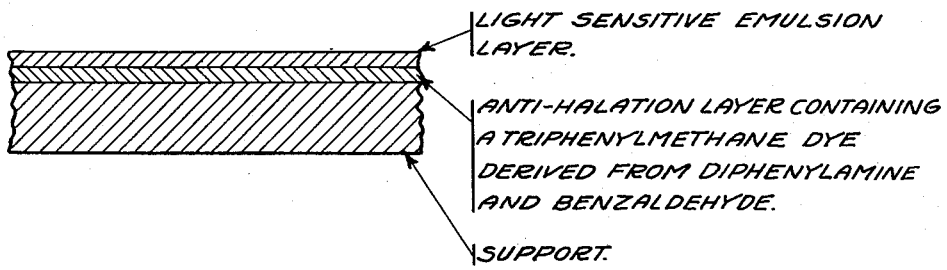

For the production of antihalo coatings the dyestuffs are either incorporated into colloids swelling in water, for instance gelatin, and the solutions thus obtained are cast in a known manner as antihalo coatings underneath the emulsion-layer as shown in Fig. 1 of the accompanying drawing or as antihalo backing layer on the back of the support for the photographic material as shown in Fig. 2 of the accompanying drawing. Instead of the gelatin also other binding agents, for instance resins soluble in alkali according to U. S. Patent 2,089,764 may be applied. Admixtures may be given to the solution augmenting the stability and softness of the layer. Films and foils consisting of cellulose derivatives, especially nitro and acetyl cellulose or regenerated cellulose, synthetic structures, glass, etc., are likewise suitable as a support for the photographic material.

Example I

In one liter water are dissolved 10 grams gelatin
10 grams dyestuff of the following constitution:

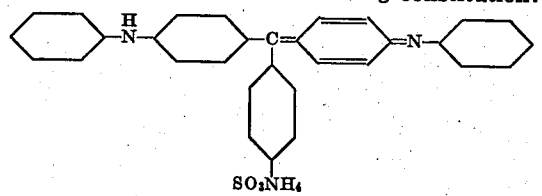

The solution is cast onto the back of the support, i. e. onto that side of the support which is opposite the emulsion layer and then dried. The antihalo coating thus obtained is effective in spectral regions beyond 700m$\mu$.

Example II

In 1.5 liter alcohol are dissolved 30 grams of a soaped polymerization product from vinylethylether and maleic acid anhydride according to U. S. Patent 2,161,788.
15 grams dyestuff of the following constitution:

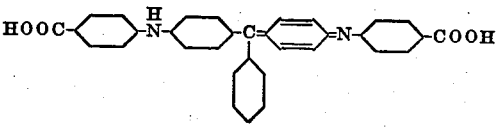

An antihalo coating obtained from this solution has an absorption maximum at about 670m$\mu$ and an effective region until far into the ultra-red.

It is easily soluble in alkaline baths, also in the developer.

Example III

In 1.5 liter alcohol are dissolved 50 grams of a condensation product from phenoxy acetic acid and formaldehyde
20 grams dyestuff of the following constitution:

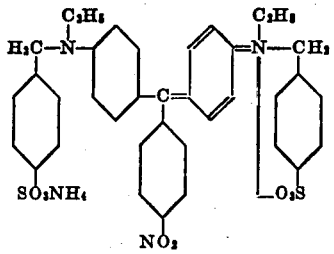

From this solution an antihalo coating with an absorption maximum at 660–665 mμ and an antihalo effect up to above 700 mμ is obtained. On account of the alkali solubility of the binding agent the layer disappears during the development.

Example IV

In 1.5 liter alcohol are dissolved 50 grams of a condensation product from phenoxy acetic acid and p-cresoldialcohol
15 grams dyestuff of the following constitution:

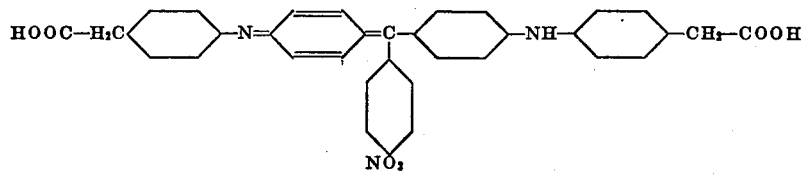

The antihalo coating obtained from this solution is effective in spectral regions beyond 700 mμ. On account of the alkali solubility of the binding agent the layer disappears during the development.

Example V

In 1 liter benzene 250 cc. acetone and 250 cc. alcohol are dissolved 20 grams dyestuff of the following constitution:

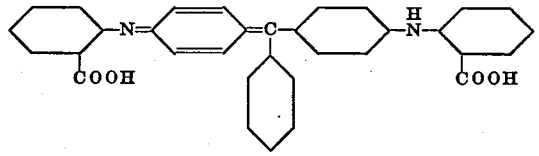

4 grams carnauba wax. The antihalo effect for a film-backing obtained from this solution corresponds to Examples 1–4.

What we claim is:

1. A photographic element provided with an antihalo coating comprising a dye corresponding to the general formula:

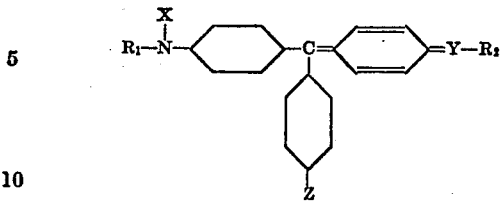

wherein
R₁ and R₂ represent members of the group consisting of benzene and benzyl radicals,
X stands for a member of the group consisting of hydrogen and alkyl,
Y stands for a bridge selected from the group consisting of tertiary and quaternary nitrogen atoms, and
Z stands for a member of the group consisting of hydrogen, nitro, sulfo and carboxyl groups.

2. A photographic element provided with an anti-halo coating comprising a dye corresponding to the formula:

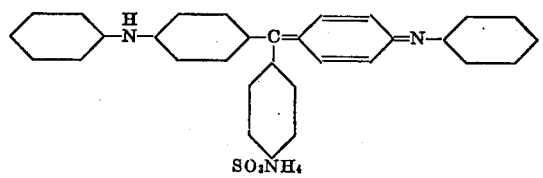

3. A photographic element provided with an anti-halo coating comprising a dye corresponding to the formula:

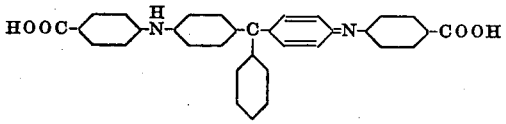

4. A photographic element provided with an anti-halo coating comprising a dye corresponding to the formula:

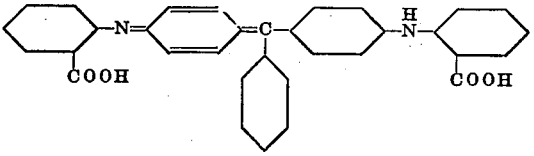

WILHELM SCHNEIDER.
RICHARD BRODERSEN.
OSWALD MEISSNER.
MAX COENEN.